(12) United States Patent
Albiez

(10) Patent No.: US 12,221,055 B2
(45) Date of Patent: Feb. 11, 2025

(54) ONE-PIECE WOVEN (OPW) PRESSURE-RESPONSIVE AIR OUTLET, IN PARTICULAR FOR APPLICATION TO AIRBAG DISCHARGE OPENINGS, AS WELL AS AN AIRBAG WITH SUCH AN AIR OUTLET SEWN THERETO

(71) Applicant: Global Safety Textiles GmbH, Bad Säckingen (DE)

(72) Inventor: Daniel Albiez, Murg (DE)

(73) Assignee: GLOBAL SAFETY TEXTILES GMBH, Bad Säckingen (DE)

( * ) Notice: Subject to any disclaimer, the term of this patent is extended or adjusted under 35 U.S.C. 154(b) by 0 days.

(21) Appl. No.: 18/471,008

(22) Filed: Sep. 20, 2023

(65) Prior Publication Data

US 2024/0109508 A1  Apr. 4, 2024

(30) Foreign Application Priority Data

Sep. 30, 2022  (DE) ..................... 10 2022 125 347.3

(51) Int. Cl.
*B60R 21/239* (2006.01)
*B60R 21/2334* (2011.01)
(Continued)

(52) U.S. Cl.
CPC ........ *B60R 21/2334* (2013.01); *B60R 21/235* (2013.01); *D03D 1/02* (2013.01);
(Continued)

(58) Field of Classification Search
CPC .............. B60R 21/2334; B60R 21/235; B60R 2021/23509; B60R 2021/23547;
(Continued)

(56) References Cited

U.S. PATENT DOCUMENTS

| | | | | |
|---|---|---|---|---|
| 6,601,614 | B1 * | 8/2003 | Ishii | ...................... D03D 15/41 |
| | | | | 139/389 |
| 7,784,828 | B2 * | 8/2010 | Matsu | ................... B60R 21/233 |
| | | | | 280/739 |
| 10,279,771 | B2 * | 5/2019 | Westoby | ................ D01D 5/423 |
| 11,007,969 | B2 * | 5/2021 | Albiez | ................... D03D 11/02 |

(Continued)

FOREIGN PATENT DOCUMENTS

| | | | |
|---|---|---|---|
| DE | 202004019448 U1 | 4/2006 | |
| DE | 102018124099 B3 | 8/2019 | |
| JP | 2020062961 A * | 4/2020 | ........... B60R 21/239 |
| JP | 7053888 B2 * | 4/2022 | ......... B60R 21/2338 |

*Primary Examiner* — Robert H Muromoto, Jr.
(74) *Attorney, Agent, or Firm* — Chrisman Gallo Tochtrop LLC

(57) ABSTRACT

A one-piece woven pressure-responsive air outlet, for use as a vent, for application to airbag discharge openings, includes a lower fabric layer, a middle fabric layer and an upper fabric layer. The lower fabric layer includes warp and weft threads and an inflow region in which the warp and weft threads float. The middle fabric layer includes warp and weft threads and a flow-through region in which the warp and weft threads float. The lower and middle fabric layers include a first chamber and a second chamber downstream of the first chamber in a flow direction. At least one of the chambers is sealed with a thread breakage zone, in which between the fabric layers, selected (warp) threads of one fabric layer are merely tacked to selected (weft) threads of the other fabric layer and are capable of breaking or rupturing at a predefined internal pressure in the chamber.

5 Claims, 3 Drawing Sheets

(51) Int. Cl.
*B60R 21/235* (2006.01)
*D03D 1/02* (2006.01)
*D03D 11/02* (2006.01)
*B60R 21/00* (2006.01)

(52) U.S. Cl.
CPC .... *D03D 11/02* (2013.01); *B60R 2021/23509* (2013.01); *B60R 2021/23547* (2013.01); *D10B 2505/124* (2013.01)

(58) Field of Classification Search
CPC .......... B60R 21/239; B60R 2021/2395; B60R 21/2342; B60R 21/233; B60R 2021/23538; D03D 1/02; D03D 11/02; D03D 15/44; D10B 2505/124
See application file for complete search history.

(56) References Cited

U.S. PATENT DOCUMENTS

| | | | |
|---|---|---|---|
| 12,017,604 B2 * | 6/2024 | Harada | B60R 21/36 |
| 2002/0106957 A1 * | 8/2002 | Ritter | D03D 3/02 |
| | | | 442/76 |
| 2005/0052008 A1 * | 3/2005 | Rose | B60R 21/2346 |
| | | | 280/740 |
| 2006/0131855 A1 * | 6/2006 | Kreuzer | B60R 21/276 |
| | | | 280/740 |
| 2008/0026657 A1 * | 1/2008 | Sollars | B32B 3/22 |
| | | | 442/76 |
| 2010/0048079 A1 * | 2/2010 | Fujiyama | B60R 21/235 |
| | | | 139/384 R |
| 2013/0334801 A1 * | 12/2013 | Williams | B60R 21/239 |
| | | | 112/475.08 |

* cited by examiner

ONE-PIECE WOVEN (OPW) PRESSURE-RESPONSIVE AIR OUTLET, IN PARTICULAR FOR APPLICATION TO AIRBAG DISCHARGE OPENINGS, AS WELL AS AN AIRBAG WITH SUCH AN AIR OUTLET SEWN THERETO

BACKGROUND OF THE INVENTION

The present invention relates to a one-piece woven (OPW) pressure-responsive or pressure-dependent air outlet, in particular for application, i.e. for attachment or mounting, to airbag discharge openings, comprising a lower fabric layer, a middle fabric layer and an upper fabric layer, and further relates to an airbag having such an air outlet sewn thereto.

Pressure-responsive or pressure-dependent air outlets in airbags for vehicle occupant restraint systems, so-called vents or discharge valves, are known from the prior art. In this case, inflated airbags are to be vented using a targeted "air outlet", which is released when required. This, in particular, applies to the passenger airbags and driver airbags. The known solutions are often based on complex sewn so-called Cut&Sew Airbags, which are sewn together ("Sew") from pieces of fabric cut out ("Cut") from flat textile material. These Cut&Sew Airbags are very time consuming and therefore expensive to produce. In addition, the complexity of the manufacturing process requires a high degree of process safeguards to ensure the proper functioning of the components.

For example, US 2013/0334801 A1 shows an air outlet sewn together from many individual parts, which must be elaborately manufactured and sewn in separately during the manufacture of an airbag.

From the U.S. Pat. No. 7,784,828 B2 it can be learned that an airbag has very complicated active air outlets or vents, which are arranged in the airbag wall at various locations. These vents are opened by the so-called tethers sewn into the wall of the airbag in specific pressure situations. Manufacturing of such air outlets is complex and expensive. Fastening the tethers in the wall of the airbag poses a major challenge to their strength.

From the German utility model DE 20 2004 019 448 U1, there is known an airbag module with a permanently open discharge opening, which is covered by a fixed or hard cover plate. This design takes up large space and is unsuitable for pressure-responsive venting of a gas bag.

BRIEF SUMMARY OF THE INVENTION

It is thus an object of the invention to propose an air outlet which now avoids, or at least greatly diminishes, the known disadvantages in prior art.

The object is achieved with an air outlet according to claim 1, namely a one-piece woven (OPW) pressure-responsive or pressure-dependent air outlet, in particular for use as a vent, for application or attachment to airbag discharge openings, which air outlet comprises a lower fabric layer, a middle fabric layer and an upper fabric layer, and which is characterized in that:
a) the lower fabric layer comprises warp and weft threads and an inflow region in which the warp and weft threads float,
b) the middle fabric layer comprises warp and weft threads and a flow-through region in which the warp and weft threads float,
c) wherein the lower fabric layer and the middle fabric layer substantially include or form at least a first chamber,
d) wherein a second chamber is arranged downstream of the first chamber in a flow direction,
e) wherein at least one of the chambers is sealed or closed with a yarn breakage zone, also referred to as thread breakage zone, in which between the fabric layers, selected (warp) threads of one fabric layer are merely tacked to selected (weft) threads of the other fabric layer and are capable of breaking or rupturing at a predefined internal pressure in the chamber.

When in this specification "(warp) yarns/threads" and "(weft) yarns/threads" are used, the expression in parentheses shall also apply interchangeably, as "(weft) yarns/threads" and "(warp) yarns/threads".

The air outlet according to the invention with an "internal pressure-responsive" or "internal pressure-dependent" air outlet opening can be produced as one piece woven (OPW) in an automated process, wherein costs can be saved both in the production of the component as well as in an assembly to a Cut&Sew Airbag. As is well known, since an OPW component can be programmed with thread/yarn precision, the precision of the components and their reproducibility can be increased. This eliminates the inaccuracy in the placement of individual components and seams that is possible with sewn airbags and applications attached to them. According to the invention, the air outlet is woven in one piece as preprogrammed and then sewn onto a conventionally manufactured sewn airbag in the area of the intended exhaust outlet in a conventional manner.

In an advantageous embodiment of the air outlet according to the invention, the air outlet is characterized in that the upper fabric layer comprises warp and weft threads and together with the middle fabric layer substantially includes or forms the downstream second chamber, wherein the second chamber comprises a thread breakage zone in which, between the upper fabric layer and the middle fabric layer, selected (warp) threads of the middle fabric layer are merely tacked to selected (weft) threads of the upper fabric layer and are capable of rupturing, i.e. tearing, or breaking at a predefined internal pressure in the second chamber.

A further advantageous design of the air outlet according to the invention is characterized in that the second chamber downstream of the first chamber is also included between the lower fabric layer and the middle fabric layer, wherein the thread breakage zone is arranged between the first chamber and the downstream second chamber. Both of the aforementioned advantageous embodiments of an air outlet according to the invention have the particular advantage of being simple and thus inexpensive, as well as being particularly precise in their manufacture.

In yet another advantageous embodiment of the air outlet according to the invention, it is applied or attached to a Cut&Sew Airbag by sewing or stitching.

The object is further achieved with an air outlet according to claim 5, namely an airbag having an air outlet sewn thereto according to any one of the foregoing claims. Such an airbag is then available ready for assembly for the production of modules for vehicle occupant restraint systems.

Further features and advantages of the invention are apparent from the sub-claims, i.e. dependent claims 2 to 4.

BRIEF DESCRIPTION OF THE DRAWINGS

In order to explain the invention in detail and to show how it can be implemented, it is described below with reference to the following drawings.

DETAILED DESCRIPTION OF THE INVENTION

For the purpose of easier understanding of the construction, all illustrations are shown separated, i.e. pulled apart, from each other. Naturally, in fact, the individual fabric layers lie closely on top of each other.

Although the term "float" is known to the skilled person, it is to be briefly explained. In a woven fabric, warp threads/yarns and weft threads/yarns present there are connected to each other via weave bindings. The simplest weave is the so-called plain weave. In this case, a warp thread and a weft thread cross each other. The term "floating" means that the intersecting threads do not form a bond (i.e. a weave binding) with each other, but simply lie next to each other unbound. Further details can be found in the relevant technical literature, see also DIN 62050.

Figure 1:
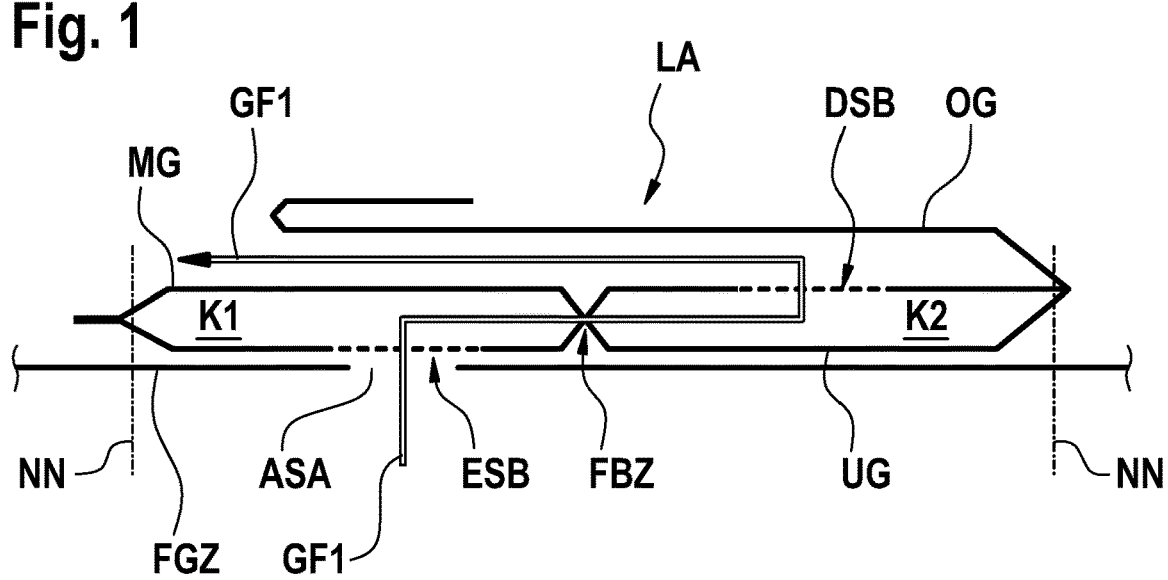
FIG. 1 shows a highly schematized first embodiment of an air outlet according to the invention in section from the side.

In FIG. 1, the observer recognizes three fabric layers of a one-piece woven (OPW) pressure-responsive or pressure-dependent air outlet LA, a lower fabric layer UG, a middle fabric layer MG and an overlying upper fabric layer OG. The three fabric layers UG, MG and OG are woven together as one piece at places at a woven seam WN. A woven seam WN is formed when at least two fabric layers are combined and woven into one fabric layer during the weaving process.

In contrast to this, a so-called stitching seam or sewn seam behaves as follows: a stitching/sewn seam is formed by stitching/sewing together at least two fabric layers with at least one (1) thread/yarn.

As can be seen on the left side of FIG. 1, a first chamber K1 is arranged between the lower fabric layer UG and the middle fabric layer MG. This first chamber K1 has a dashed inflow region ESB on its underside, in which the warp and weft threads/yarns of the lower fabric layer UG float, i.e. are not interwoven. The effect of this design is that air impacting on this inflow region ESB can flow through the lower fabric layer UG, as it pushes aside the floating threads/yarns transversely to the direction of thread/yarn travel, thus creating a passageway, and can therefore flow through the corresponding fabric layer. Yet, normally unaffected, this area is and appears closed. On the right side, a second chamber K2 can be seen downstream of the first chamber K1. A yarn breakage zone, also referred to as thread breakage zone, FBZ is arranged between the first chamber K1 and the downstream second chamber K2. This will be discussed in more detail below. The second chamber K2 has a so-called flow-through region DSB drawn dotted there in the middle fabric layer MG, in which the warp and weft threads/yarns of the middle fabric layer MG float.

Figure 2:
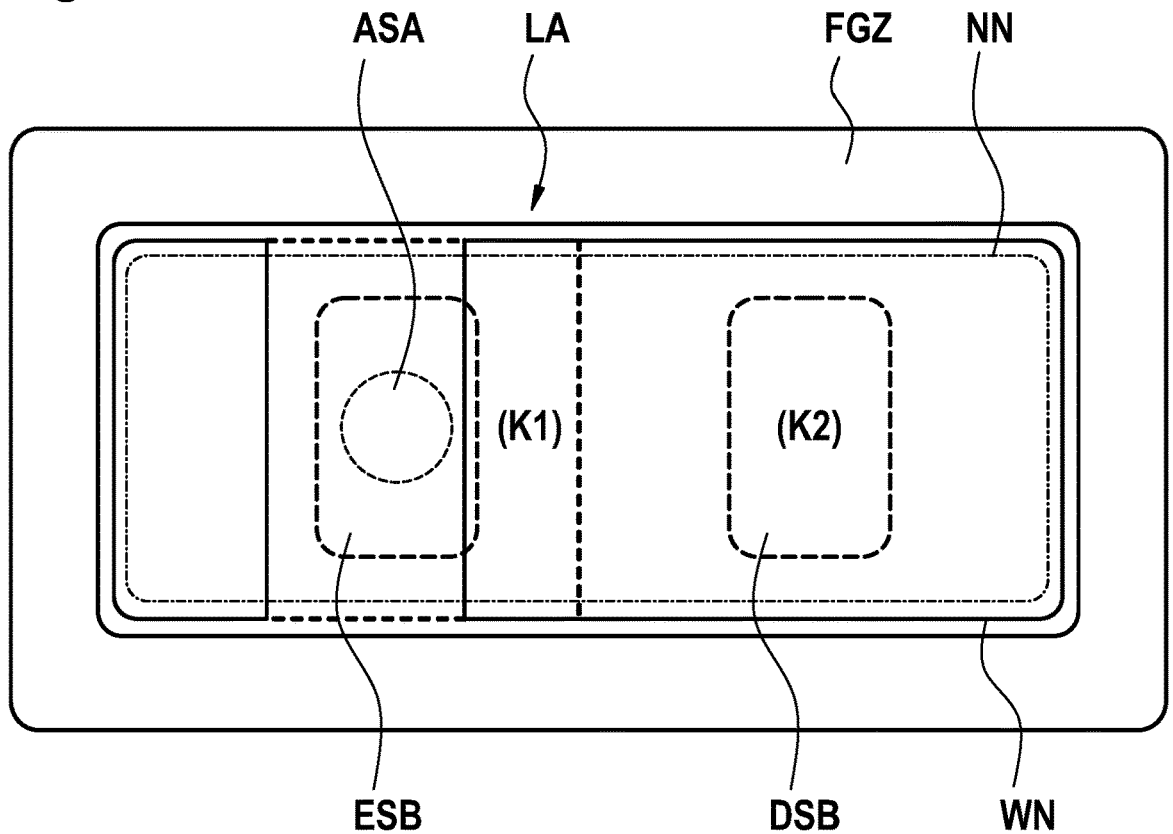
FIG. 2 shows a top view of the air outlet as shown in FIG. 1, sewn onto a flat fabric of a conventionally manufactured, i.e. sewn, airbag.

FIGS. 1 and 2 show an embodiment of an OPW air outlet LA according to the invention in a state as it comes from production as a "sectional and plan view". The shape—in this case a rectangle (FIG. 2)—is used only to illustrate the principle. In principle, the component can be manufactured in any shape, provided that the principle of the invention set forth herein can be integrated.

In the yarn breakage zone FBZ located between chambers K1 and K2, warp threads KF of the lower fabric layer UG are not firmly interwoven with weft threads SF of the middle fabric layer MG, but only tacked. Reference is made to the fact that the principle is described here. Accordingly, in turn, the warp threads KF of the middle fabric layer MG cannot be firmly woven with weft threads SF of the lower fabric layer UG, but only tacked. This connection is designed in such a way that they can withstand only a defined pressure, i.e. the construction makes it possible to tear the connection of the middle fabric layer MG with the lower fabric layer UG in the yarn breakage zone FBZ by the warp threads KF tearing through the weft threads SF when air under pressure flows according to the arrow GF1 through the inflow region ESB through the yarn breakage zone FBZ from the first chamber K1 into the second chamber K2 and from there through the middle fabric layer MG in its flow-through region DSB upwards towards the upper fabric layer OG.

Below the one-piece woven air outlet LA shown in section in FIG. 1, a flat woven fabric blank or a flat woven fabric cut FGZ of a conventionally manufactured airbag not shown further is represented by a line FGZ, which comprises an outflow cutout ASA located on the left side of FIG. 1, below the chamber K1 and directly parallel to the inflow region ESB—here exemplarily oval-shaped. This outflow cutout ASA represents the opening of the sewn airbag which is not shown further. The entire air outlet LA described here is conventionally sewn to the flat woven fabric blank FGZ via stitching seams, i.e. sewing seams, NN in the area of the woven seam WN.

In FIG. 2, the air outlet LA as shown in FIG. 1 is shown as viewed from above. For ease of reference, the individual fabric layers are shown in transparent form. What can be seen is the position of the—here exemplarily round—outflow cutout ASA of the flat woven fabric blank FGZ of the conventionally sewn airbag, onto which the air outlet LA is sewn. The inflow region ESB of the first chamber K1 is arranged above the outflow cutout ASA. On the right side of FIG. 2 there can be seen the position of the flow-through region DSB of the second chamber K2. The woven seam WN of the air outlet LA is marked with a thick drawing line.

Figure 3:
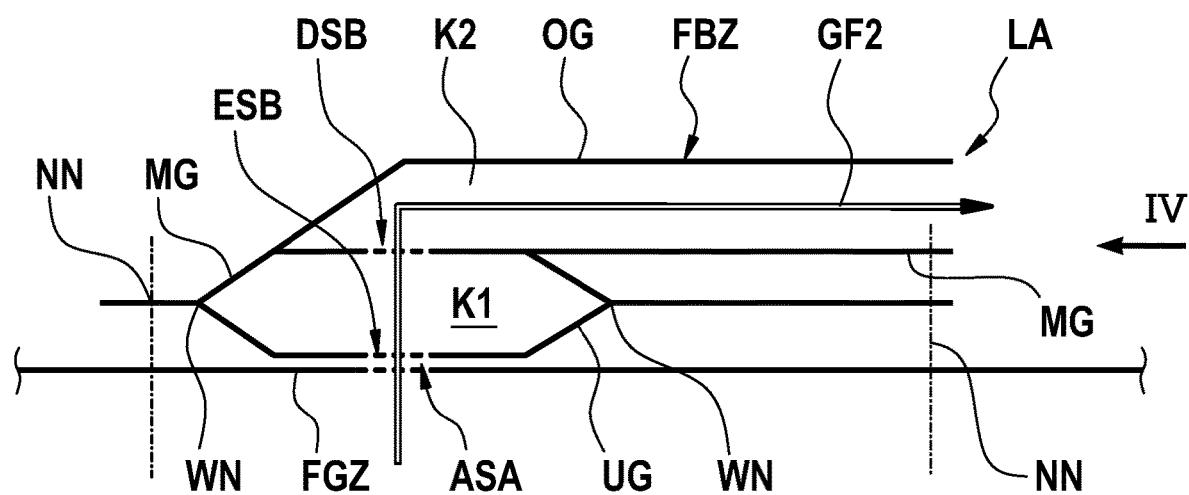
FIG. 3 shows a highly schematized second embodiment of an air outlet according to the invention in section from the side.

FIG. 3 shows another second embodiment of an air outlet LA according to the invention. What can be seen here just as an example is the flat woven fabric blank FGZ, on which the air outlet LA according to the invention is conventionally sewn on by means of dashed vertical stitching/sewing seams NN. The flat woven fabric blank FGZ has an outflow cutout ASA over which the air outlet LA is arranged with a dashed inflow region ESB of a first chamber K1. The first chamber K1 lying between a lower fabric layer UG and an overlying middle fabric layer MG connected thereto by a woven seam WN comprises a flow-through region DSB lying opposite the inflow region ESB and opening into an overlying second chamber K2. The warp and weft threads of the inflow region ESB and the flow-through region DSB again float as in the previously described embodiment and each form a region that allows air to pass through. The second chamber K2 is located here between the middle fabric layer MG and an upper fabric layer OG and is sealed with a yarn breakage zone FBZ. When air under a predetermined pressure now flows outwardly through the outflow cutout ASA of the flat woven fabric blank FGZ of the conventionally sewn airbag following the arrow GF2 and through the inflow region ESB, the chamber K1 and the flow-through region DSB into the second chamber K2, the threads of the yarn breakage region FBZ are loaded in such a way that the warp and/or weft threads KFR, SFR, which are loosely stitched together, tear and thus allow the airbag to be vented. This will be described in more detail below.

Figure 4:
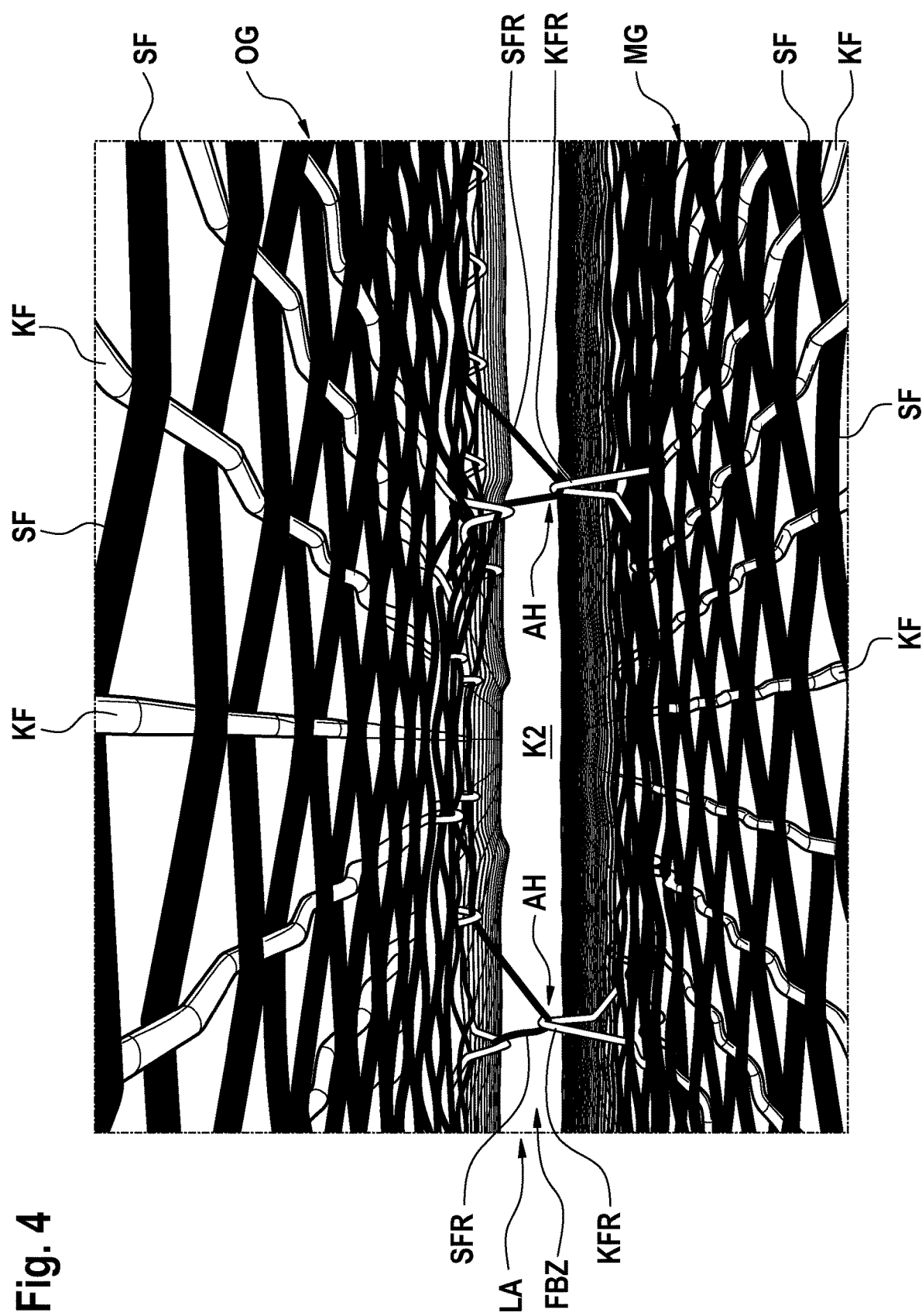
FIG. 4 shows a highly schematized and enlarged section of the air outlet with lower fabric layer and overlying upper fabric layer according to FIG. 3, seen according to arrow IV from the right to show a yarn breakage zone, also referred to as thread breakage zone, in perspective view.

FIG. 4 shows a schematic view of the illustration in FIG. 3 in the direction of arrow IV. Between the middle fabric layer MG and the upper fabric layer OG, individual warp threads KFR can be seen which are tacked to individual weft threads SFR as OPW tacking threads ΔH and form a yarn breakage zone FBZ. These OPW tacking threads AH or their warp threads KFR and weft threads SFR tear when, as previously described, the air from the airbag reaches a predetermined pressure and is released from the airbag, allowing the fabric layers of the chamber K2 to move further from one another. The path of the now freely escaping air is indicated by the arrow GF2 (FIG. 3).

In FIG. 4, a part of the one-piece woven (OPW) pressure-responsive air outlet LA according to the invention is shown in detail, as seen from the right according to arrow IV. What can be seen is a chamber K2, a yarn breakage zone FBZ, its middle fabric layer MG and an overlying upper fabric layer OG with warp threads KF and weft threads SF. The warp threads KF of the two fabric layers run substantially into and out of the image plane. The weft threads SF run substantially at right angles thereto in the transverse direction. The situation shown in chamber K2 shows the moment after ignition of a gas generator (not shown), wherein the internal pressure in the one-piece woven (OPW) pressure-responsive air outlet LA according to the invention has already somewhat forced apart the middle fabric layer MG and the upper fabric layer OG lying above it. A large number of OPW tacking threads AH are arranged across the width of the air outlet LA—for a better overview, only two OPW tacking threads AH are shown here as an example—where it can be seen that warp threads KFR emerging from the middle fabric layer MG are looped through weft threads SFR emerging from the upper fabric layer OG, pulling them slightly out of the respective fabric layer. If the internal pressure in the pressure-responsive OPW air outlet LA reaches then a predetermined level, this causes the distance between the opposing fabric layers to increase and the OPW tacking threads AH to tear, breaking or rupturing the warp threads KFR and/or the weft threads SFR. The two fabric layers facing each other can move away from each other. The air flow passes through the yarn breakage zone FBZ—now unhindered by OPW tacking threads AH—and can be diverted to the outside. The vent or air outlet function is fulfilled.

REFERENCE SIGNS

AH OPW (one-piece woven) tacking thread
ASA outflow cutout
DSB flow-through region
ESB inflow region
FBZ yarn/thread breakage zone
FGZ flat woven fabric blank/cut
GDO gas flow opening
GF1 gas flow arrow
GF2 gas flow arrow
K1 first chamber
K2 second chamber
KF warp thread/yarn
KFR warp thread/yarn
KFR warp thread/yarn
LA air outlet
MG middle fabric layer
NN stitching seam/sewing seam
OG upper fabric layer
SF weft thread/yarn
SFR weft thread/yarn
SFR weft thread/yarn
UG lower fabric layer
WN woven seam

The invention claimed is:

1. A one-piece woven (OPW) pressure-responsive air outlet, in particular for use as a vent, for application to airbag discharge openings, said one-piece woven (OPW) pressure-responsive air outlet comprising a lower fabric layer (UG), a middle fabric layer (MG) and an upper fabric layer (OG) wherein:
   a) the lower fabric layer (UG) comprises warp and weft threads and an inflow region (ESB) in which the warp and weft threads float,
   b) the middle fabric layer (MG) comprises warp and weft threads and a flow-through region (DSB) in which the warp and weft threads float,
   c) wherein the lower fabric layer (UG) and the middle fabric layer (MG) substantially include at least a first chamber (K1),
   d) wherein
      a second chamber (K2) is arranged downstream of the first chamber (K1) in a flow direction,
   e) wherein at least one of the chambers (K1, K2) is sealed with a thread breakage zone (FBZ), in which between the fabric layers, selected (warp) threads of one fabric layer are merely tacked to selected (weft) threads of the other fabric layer and are capable of breaking or rupturing at a predefined internal pressure in the chamber.

2. The air outlet according to claim 1, wherein
   f) the upper fabric layer (OG) comprises warp and weft threads and together with the middle fabric layer (MG) substantially includes the downstream second chamber (K2),
   g) wherein the second chamber (K2) comprises a thread breakage zone (FBZ) in which, between the upper fabric layer (OG) and the middle fabric layer (MG), selected (warp) threads of the middle fabric layer (MG) are merely tacked to selected (weft) threads of the upper fabric layer (OG) and are capable of breaking or rupturing at a predefined internal pressure in the second chamber (K2).

3. The air outlet according to claim 1, wherein the second chamber (K2) downstream of the first chamber (K1) is also included between the lower fabric layer (UG) and the middle fabric layer (MG), and the thread breakage zone (FBZ) is arranged between the first chamber (K1) and the downstream second chamber (K2).

4. The air outlet according to claim 1, wherein the air outlet is applied to a Cut&Sew Airbag by sewing.

5. An airbag having the air outlet according to claim 1 sewn thereto.

* * * * *